106. COMPOSITIONS, COATING OR PLASTIC.

90

Patented Sept. 23, 1930

1,776,740

*Asbestos (dyed)* Examiner
*Binder (waterproof glue)*

UNITED STATES PATENT OFFICE

EDGAR S. ROSS, OF PITTSBURGH, PENNSYLVANIA, ASSIGNOR TO THE PHILIP CAREY MANUFACTURING COMPANY, A CORPORATION OF OHIO

MINERAL FIBROUS MATERIAL AND PROCESS OF MANUFACTURE

No Drawing.   Application filed February 24, 1926.   Serial No. 90,428.

My invention relates to a mineral fibrous product and process of manufacture. It is addressed more especially to a product, that is of any desired color throughout and can be formed to any desired shape, composed of artificially colored mineral fibers and a binder.

I have found that by artificially coloring asbestos fibers by the process of dyeing them using direct acid or basic organic dyes and then mixing the fibers with a suitable binder and forming the same into the desired product I am able to obtain highly satisfactory colored material.

My invention is adapted to the production of mineral papers such as asbestos papers or felts, solid products such as shingles, panelboards, tile, etc., plastic or semi-plastic materials, such as a colored cement, in all of which is used asbestos fibers and a binder.

In explaining the invention I will describe same as applied to a product of asbestos fibers and a binder such as a waterproof glue to form a solid product. I take the dry asbestos fibers as commercially sold, of any grade desired, and dye them in a solution of organic dye, such as Du Pont's paratone, by introducing the fibers into the dye, while it is at a boiling temperature, and thoroughly stir the fibers therein. I then remove the fibers from the dye solution and air dry same. The dyed fibers are then mixed with a waterproof glue after which the mixture of fibers and glue is submitted to compression to remove the surplus binder, compact the mass and form it to the desired shape, after which it is dried.

While I have described one form of my invention I would not be limited to that form or to the materials referred to or process described as my broad invention is a product composed of mineral fibers artificially colored by the process of dyeing which are combined with a suitable binder.

My invention is primarily addressed to formaton of a product in which the bulk is of mineral fibers, such as asbestos, but if desired the fibers could be combined with other filler materials or could be combined with a binder material of greater bulk so that in the finished product the greater portion of the volume would be the filler or binder—as for instance in the manufacture of asbestos cement products such as shingles, lumber, wall board, etc.

In my process I prefer to use a dye for coloring the fibers which when the fibers are mixed with the binder forming a fluid mixture, either by using a binder of a fluid character, or combining a binder with a suitable liquid to form such fluid mixture, will impart to such fluid mixture a color similar to the color of the fibers so that the final product will have throughout the same color. If desired, as for instance in asbestos cement products, I desire to form a non-fading product I add to the fluid mixture, after the color has been imparted to the mass, any suitable fixing agent, and then mould or form the product to its desired shape. For fixing the color either an agent that will have the desired result with or without boiling the fluid mixture may be used.

Claims—

1. The process of manufacturing an artificially colored article composed in part of asbestos fibers which comprises mixing dyed asbestos fibers with a liquid binder, removing the surplus liquid from said mixture, and then forming the mixture to the desired shape, the dye in said fiber being of such character that it will impart to said binder a similar color throughout.

2. The process of manufacturng an artificially colored article containing mineral fibers and a binder which comprises forming a fluid mixture containing artificially colored mineral fibers and a fluid binder, the fluid binder and the coloring in said fibers being of such character that the coloring will impart to said binder a similar color throughout, fixing said color, removing the surplus binder, and forming the mixture to the desired shape.

In testimony whereof, I have signed my name to this specification.

EDGAR S. ROSS.